(12) United States Patent
Dunlap

(10) Patent No.: US 7,556,276 B1
(45) Date of Patent: Jul. 7, 2009

(54) BICYCLE REAR WHEEL SUSPENSION CHASSIS

(75) Inventor: Charles Emet Dunlap, Manitou Springs, CO (US)

(73) Assignee: Charles E. Dunlap, Manitou Springs, CO (US)

( * ) Notice: Subject to any disclaimer, the term of this patent is extended or adjusted under 35 U.S.C. 154(b) by 166 days.

(21) Appl. No.: 11/566,210

(22) Filed: Dec. 2, 2006

(51) Int. Cl.
*B62K 25/28* (2006.01)

(52) U.S. Cl. .................................................. 280/284

(58) Field of Classification Search ............... 280/284, 280/285, 286, 288
See application file for complete search history.

(56) References Cited

U.S. PATENT DOCUMENTS

| | | | |
|---|---|---|---|
| 625,456 A | 5/1899 | Mills | |
| 3,917,313 A | 11/1975 | Bultoco et al. | |
| 4,058,181 A | 11/1977 | Buell | |
| 5,205,572 A * | 4/1993 | Buell et al. | 280/284 |
| 5,217,241 A | 6/1993 | Girvin | |
| 5,244,224 A | 9/1993 | Busby | |
| 5,306,036 A * | 4/1994 | Busby | 280/284 |
| 5,435,584 A * | 7/1995 | Buell | 280/284 |
| 5,474,318 A | 12/1995 | Castellano | |
| 5,509,679 A | 4/1996 | Leitner | |
| 5,553,881 A | 9/1996 | Klassen | |
| 5,957,473 A | 9/1999 | Lawwill | |
| 6,102,421 A * | 8/2000 | Lawwill et al. | 280/284 |
| 6,161,858 A | 12/2000 | Tseng | |
| 6,199,886 B1 | 3/2001 | Guenther | |
| 6,450,521 B1 | 9/2002 | Turner | |
| 6,877,591 B1 * | 4/2005 | Hso | 188/321.11 |
| 7,048,292 B2 | 5/2006 | Weagle | |
| 7,066,481 B1 * | 6/2006 | Soucek | 280/284 |
| 2003/0038450 A1 | 2/2003 | Lam | |
| 2005/0184483 A1 | 8/2005 | Buckley | |
| 2006/0071442 A1 | 4/2006 | Hoogendoorn | |
| 2006/0181053 A1 | 8/2006 | Huang et al. | |
| 2006/0197306 A1 | 9/2006 | O'Connor | |

OTHER PUBLICATIONS

Edmund R. Burke, PhD, Bicycle Suspension Systems (Ch.2), High-Tech Cycling, © 1996, pp. 45-64, Human Kinetics, Champaign, IL 61825 USA.

* cited by examiner

*Primary Examiner*—Tony H. Winner

(57) ABSTRACT

A Bicycle Rear Wheel Suspension Chassis for a Bicycle. Improved performance, low center of gravity, and ground clearance result from a Front Triangle Frame 1 with Steering Housing 25 and Crank Shaft Housing 20, a Link 2 with forward most end pivotally attached to Lower Pivot 22, a Swingarm Chassis 24 pivotally attached to rearward most end of said Link 2, and a rear wheel pivotally attached at Rear Axle Location 19 to said Swingarm Chassis 24. The Shock Absorber 7 attached to said Swingarm Chassis 24 provides means for suspension spring rate and damping for isolating a bicycle rider from trail impacts with the rear wheel. Performance and handling advantages result from a low center of gravity system, a Link 2 at the Lower Pivot 22 that provides better control by reacting to travel over trail objects, and a moving instant center that reacts optimally to impacts of varying magnitude and frequency.

6 Claims, 11 Drawing Sheets

BICYCLE REAR WHEEL SUSPENSION CHASSIS

CROSS REFERENCE TO RELATED APPLICATIONS

None.

FEDERALLY SPONSORED RESEARCH

None.

SEQUENCE LISTING

None.

BACKGROUND OF THE INVENTION

1. Field of Invention

This invention relates to rear suspension bicycle frames, particularly off-road rear suspension bicycles used on terrain with varying conditions and surfaces, with loose and immovable objects to travel over.

2. Prior Art

Rear suspension has proven to be a benefit in comfort and performance bicycles. This benefit is especially realized with off-road bicycles. Rear bicycle suspension absorbs shock from road and/or trail surface variations. By absorbing impacts, tire traction is improved giving the rider improved control of the bicycle. Improved tire traction is a benefit in lateral, forward, and rearward directions. Cornering, turning, accelerating, climbing, and braking are improved.

Typical rear bicycle suspension designs found in prior art are comprised of linkages, similar to those used in automobiles and motorcycles. The composition of rear suspension linkages make up the suspension chassis. Prior art designs have attempted to increase pedaling efficiency through arrangement of the linkages while still providing shock absorption for improved traction in turning and braking. Four-bar linkages and similar single swingarm linkages have commonly been used in prior art linkage arrangements for rear suspension. Prior art and bicycles of these types in general have always had an undesirable high center of gravity. Overcoming taller trail obstacles has also presented challenges to even the most skilled riders.

More recently, the inventor of the present application has developed a unique design that improves pedaling efficiency and handling over prior art designs, while allowing for maximum bump absorption for many different types of terrain. Even though designs such as U.S. Pat. Nos. 5,957,473 and 5,509,679 have advantages over prior art designs, limitations exist on their geometry, inherent high center of gravity, overcoming immovable trail objects, and other performance characteristics. These designs are well known in the field.

More recent designs in the field such as U.S. Pat. Nos. 6,450,521 and 6,203,042 have addressed other issues with certain general performance characteristics, but still fail to recognize inherent high center of gravity issues, overcoming taller immovable trail objects, and performance characteristics related to a high center of gravity.

As a result, there has been a need for an alternative design that provides superior performance over prior art of the present application. There has been a need for a design with the superior handling of a low center of gravity bicycle that responds when traveling over larger trail obstacles.

OBJECTS AND ADVANTAGES

Accordingly, several objects and advantages of the present invention are:

(a) to provide a lower center of gravity suspension chassis that improves bicycle handling and performance. The advantage is more control of the bicycle by its rider;

(b) to provide a low center of gravity suspension chassis that reduces bicycle swing inertia in rocking side to side when pedaling. The advantage is more control of the bicycle by its rider;

(c) to provide a low center of gravity suspension chassis where the lower linkages maintain nearly constant ground clearance when suspension travel is used. The advantage to the bicycle rider is greater ground clearance to avoid ground and trail object contact causing loss of control;

(d) to provide a link and swingarm chassis system where the link is below the bicycle crank shaft housing. If said link is contacted by immovable trail objects said link rotates rearward moving the rear wheel upward out of the way of the immovable trail object. The advantage is more control of the bicycle by its rider over taller trail objects;

(e) to provide a link and swingarm chassis system where the link is nearly tangent to the rear wheel. If said link is contacted by trail objects they are redirect along the link in a direction tangent to the rear wheel. Objects moving in a direction tangential to the wheel require less effort and less skill to travel over. The advantage is more control of the bicycle by its rider over taller trail objects;

(f) to provide a linkage arrangement that has a moving instant center in front and above the crank shaft that moves forward as the rear suspension is compressed. The location of said moving instant center provides maximum pedaling efficiency by balancing chain forces, tire traction forces, and rider weight forces;

(g) to provide a moving instant center that moves forward as the rear suspension is compressed. The forward movement of said moving instant center results in a higher rear suspension chassis natural frequency at the start of the suspension compression. As the suspension is compressed said rear suspension chassis natural frequency decreases. The initial higher natural frequency gives the bicycle rider better control over high frequency/small amplitude impacts, while the lower natural frequency gives the bicycle rider better control over the lower frequency/large amplitude bumps. The advantage is a suspension chassis that responds appropriately to varying impacts giving the bicycle rider maximum control.

SUMMARY OF INVENTION

In accordance with the present invention, the unique geometric arrangement lowers the center of gravity of the bicycle compared to prior art designs by placing the suspension chassis members in a lower position than prior art while still reacting to help travel over trail obstacles. Lower center of gravity reduces the swing inertia of the bicycle while providing greater stability in handling and cornering.

While reacting to travel over objects in the trail, the unique suspension chassis also protects the bicycle rear wheel from taller trail objects that can make it difficult for the rider to travel over. The unique linkage design provides a skid plate that helps to actuate the rear suspension, where the rear wheel will actually lift up with significant lower linkage contact to clear the immovable object. Skid plates have been used on bicycles in prior art but these applications failed to use the skid plate as a means to activate the rear suspensions in traveling over tall obstacles or as part of the suspension chassis to lower the bicycle center of gravity.

The rear suspension chassis provides a unique geometric arrangement and rear wheel response for maximum pedaling efficiency over varying terrain. The rear wheel movement neutralizes pedaling induced suspension movement by altering wheel path about its moving instant center. The said moving instant center also varies the natural frequency of the system, resisting movement at lower frequency pedaling while moving freely to absorb higher frequency impacts.

Variations of the present invention include relocating the shock absorber in different locations, as well as variation in the upper and lower control arms. The said upper and lower control arms may be pivotally attached or rigidly attached to on another.

Accordingly, it is an object of the present invention to provide improved trail obstacle response and pedaling efficiency from its suspension chassis and wheel movement around a moving center.

It is a further object of the present invention to provide an improved natural frequency in the pedaling range of suspension compression, which improves traction, pedaling efficiency, and superior bump absorption.

It is yet another object of the present invention to provide an improved bicycle suspension chassis center of gravity by placing the chassis members and lower pivots below the centerline of the crank shaft housing. These characteristics and unique linkage arrangement of suspension chassis members of the present invention improve bicycle performance as it is used in the field.

It is yet another object of the present invention to provide improved ground clearance during all levels of suspension compression. Ground clearance improves performance by allowing the rider to travel over taller trail objects without contact during impacts. As the suspension moves vertically to absorb impacts from objects in the trail, the lower linkage maintains substantially constant ground clearance.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF DRAWINGS

Further features and advantages of the present invention will become apparent from the following detailed description, taken in combination with the appended drawings, in which.

DRAWINGS—REFERENCE NUMERALS

1—FRONT TRIANGLE FRAME
2—LINK
3—LEFT UPPER CONTROL ARM
4—RIGHT UPPER CONTROL ARM
5—LEFT LOWER CONTROL ARM
6—RIGHT LOWER CONTROL ARM
7—REAR SHOCK ABSORBER
8—LINK ANGLE TANGENT WITH WHEEL
9—START IC
10—END IC
11—AXLE CENTER LINE
12—GROUND CLEARANCE—UNCOMPRESSED STATE
13—GROUND CLEARANCE—COMPRESSED STATE
14—LINK ANGLE WITH GROUND
15—SQUARE IMMOVABLE TRAIL OBJECT
16—ROUND IMMOVABLE TRAIL OBJECT
17—LOOSE TRAIL OBJECT
18—TRAIL OBJECT
19—REAR AXLE LOCATION
20—CRANK SHAFT HOUSING
21—UPPER PIVOT
22—LOWER PIVOT
23—REAR PIVOT
24—SWINGARM CHASSIS
25—STEERING HOUSING

DETAILED DESCRIPTION—PREFERRED EMBODIMENT—FIG. 101, 102, 103, 104, 105

The system according to a preferred embodiment of the present invention in FIGS. 101, 102, 103, 104, and 105 comprises of a Bicycle Rear Wheel Suspension Chassis.

Figure 101:
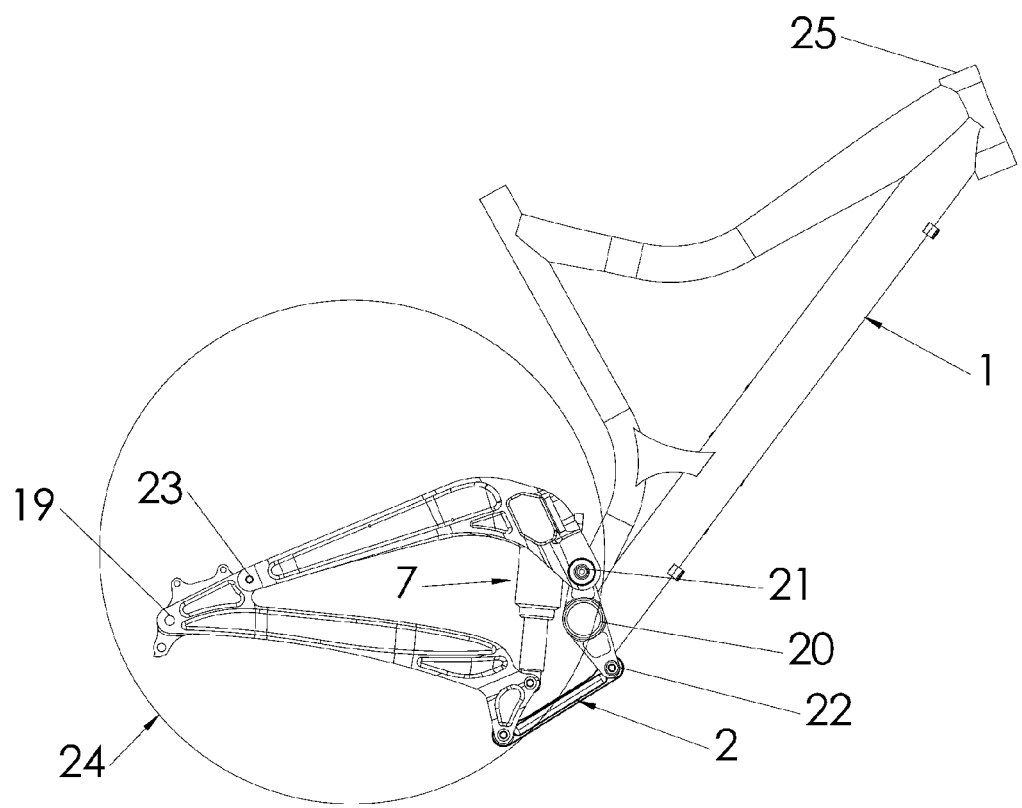
FIG. 101 is a side view of the Preferred Embodiment showing pivotally attached upper and lower control arms, with shock mounted between said control arms.

FIG. 101 shows a side view of the preferred embodiment of the present invention. The Front Triangle Frame 1 is a welded structure or similar. The Steering Housing 25 pivotally attaches to handlebars, fork and front wheel. The Crank Shaft Housing 20 pivotally attaches to a crank system for pedaling. A rear wheel pivotally attaches to the Rear Axle Location 19. The Link 2 pivotally attaches to the Lower Pivot 2. The Rear Pivot 23 is above and forward from said Rear Axle Location 19. Said Lower Pivot 22 is approximately 50 mm below the geometric center of said Crank Shaft Housing 20. The Upper Pivot 21 is above said Crank Shaft Housing 20. The Rear Shock Absorber 7 is attached to the Swingarm Chassis 24, providing means for suspension spring rate and damping.

Figure 102:
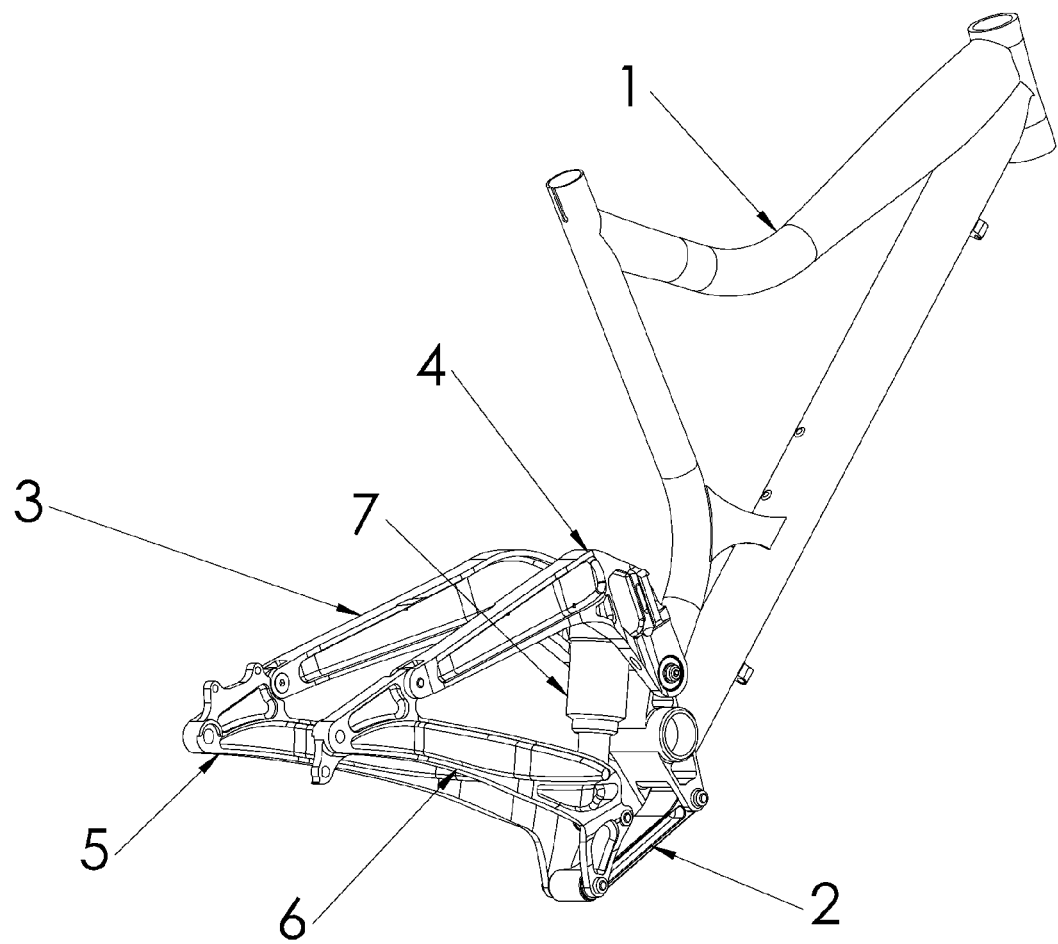
FIG. 102 is a close up side view of the Preferred Embodiment showing pivotally attached upper and lower control arms, with shock mounted between said control arms.
Figure 103:
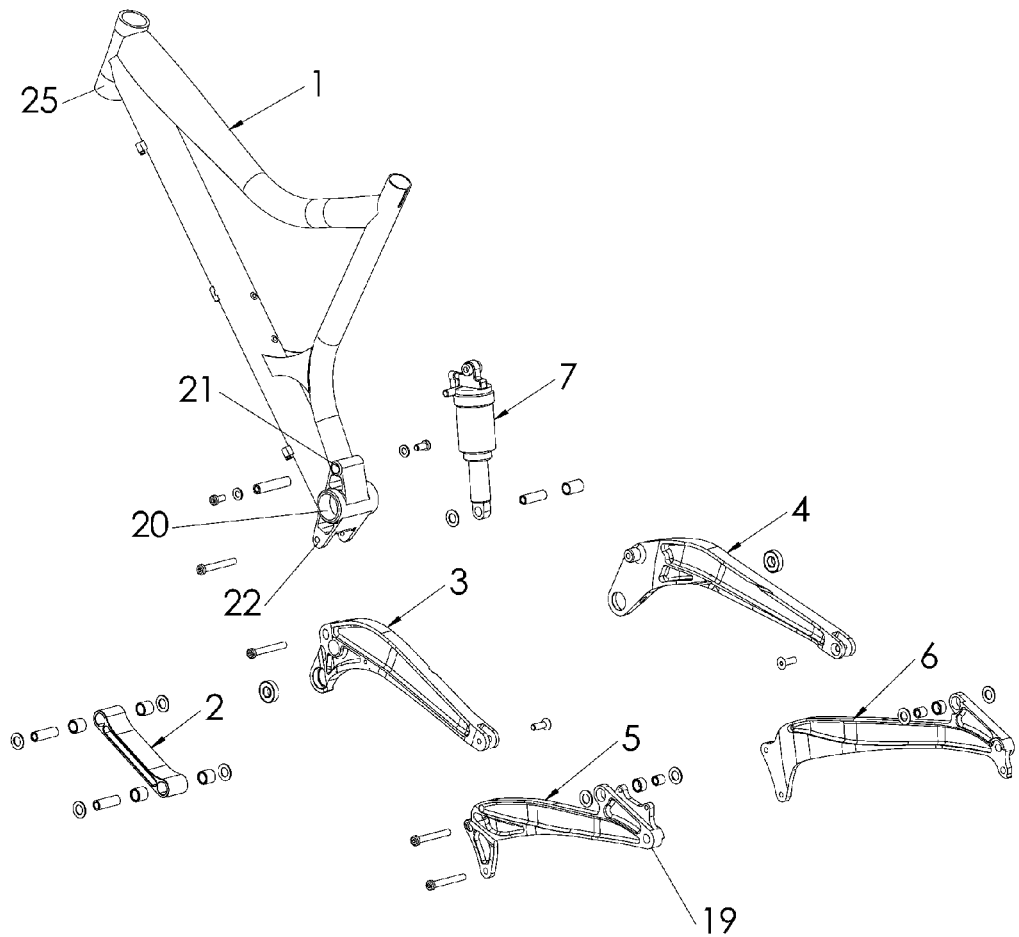
FIG. 103 is an exploded view of the Preferred Embodiment showing a possible combination of chassis members.

FIG. 102 shows a perspective view of the preferred embodiment of the present invention. Said Upper Pivot 21 above the Crank Shaft Housing 20 of the preferred embodiment is where the Left Upper Control Arm 3 and Right Upper Control Arm 4 of attach to the Front Triangle Frame 1. A variation of the described embodiment would be a Left Upper Control Arm 3 and a Right Upper Control Arm 4 attached as one by welding, bolts, or similar. Left Upper Control Arm 3 and Right Upper Control Arm 4 are pivotally attached at the Upper Pivot 21.

The Lower Pivot 22 is where the Link 2 pivotally attaches to the Front Triangle Frame 1. The Link 2 is approximately 125 millimeters in length at its two attachment points. The other end of the Link 2 pivotally attaches to the Left Lower Control Arm 5 and the Right Lower Control Arm 6.

The rearmost ends of the Left Lower Control Arm 5 and Right Lower Control Arm 6 have pivotal attachments for a rear wheel at Rear Axle Location 19. Said Left Lower Control Arm 5 and said Right Lower Control Arm 6 are pivotally attached at the Rear Pivot 23 to Left Upper Control Arm 3 and Right Upper Control Arm 4 at a location above and forward of the rear wheel axle. The Upper and Lower Control arms make up the Swingarm Chassis 24.

Operation—Preferred Embodiment—FIG. 104, 105, 108, 109, 110, 111

Figure 104:
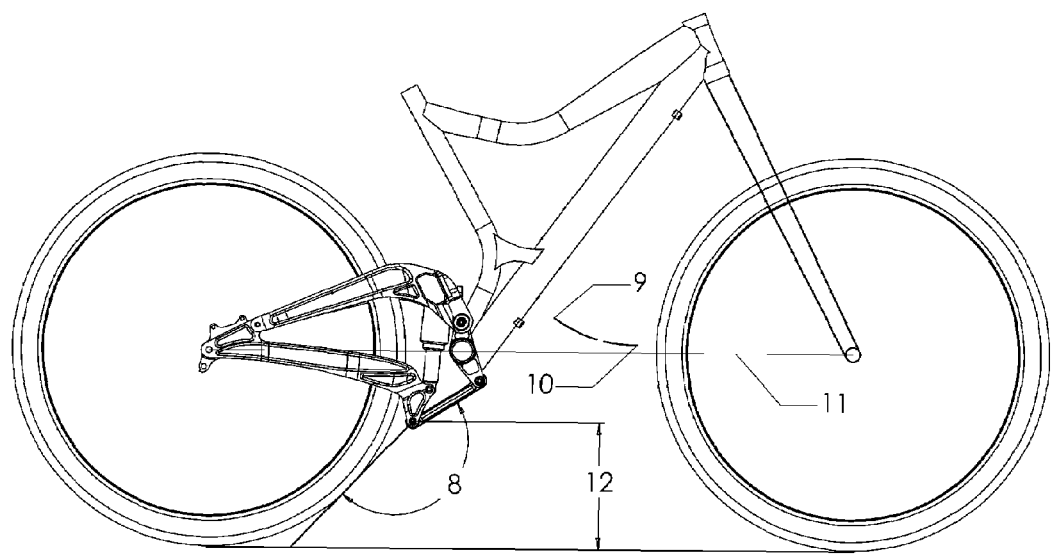
FIG. 104 is a side view of the Preferred Embodiment showing unique features such as ground clearance, link tangency to the rear wheel, the instant center movement through the travel, and axle centerline.
Figure 110:
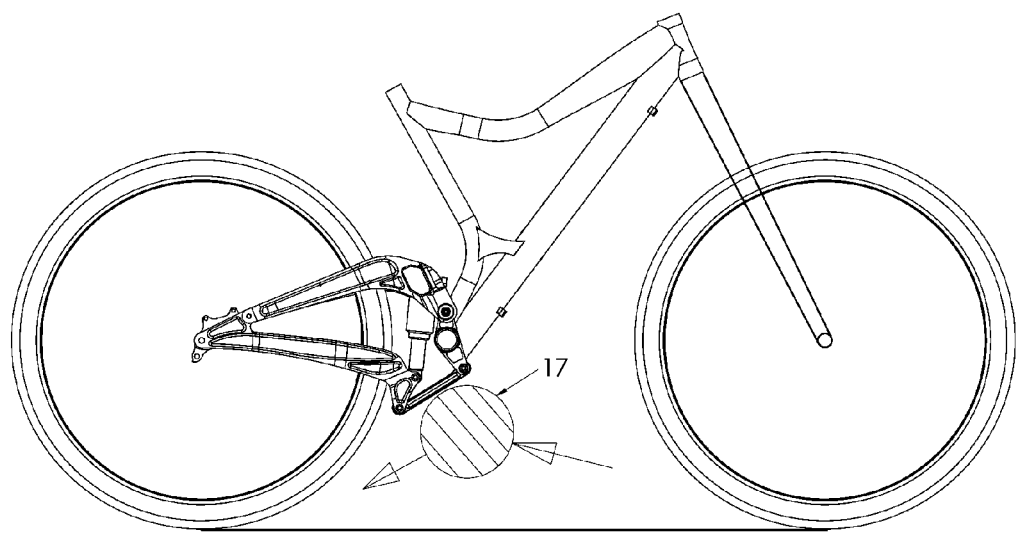
FIG. 110 shows a side view of the Preferred Embodiment making contact with a loose type of trail object where the arrows show how said loose type of trail object is redirected by contact with the link.

A preferred embodiment of the Bicycle Rear Wheel Suspension Chassis of the present invention is illustrated in FIG. 104. FIG. 104 is a side view showing the Swingarm Chassis 24 in the uncompressed state. The Link 2 is attached to the Front Triangle Frame 1 at the Lower Pivot 22 providing a lower center of gravity than previous designs. The entire Link 2 is below the Axle Center Line 11. The Link 2 is angled downward from front to rear for redirecting a Loose Trail Object 17 away from the suspension chassis as shown in FIG. 110. The arrows in FIG. 110 show the movement of said Loose Trail Object 17 as it is redirected by contact with the Link 2. It is an advantage over prior art for a suspension system to redirect loose trail objects when they are traveling upward and rearward towards a rear wheel.

Figure 108:
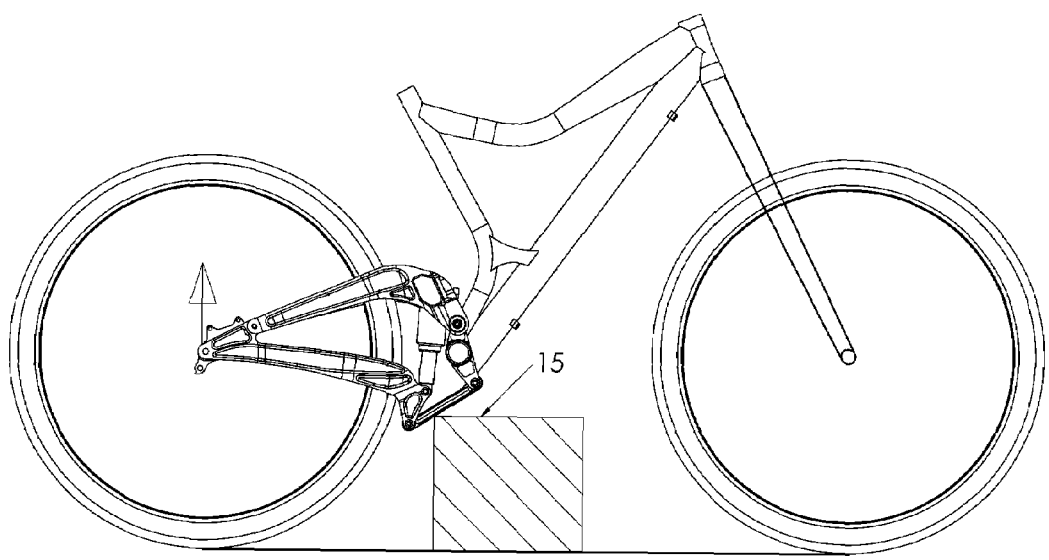
FIG. 108 shows a side view of the Preferred Embodiment making contact with a square immovable trail object where the upward arrow on the rear wheel shows the suspension chassis upward movement from said contact.
Figure 109:
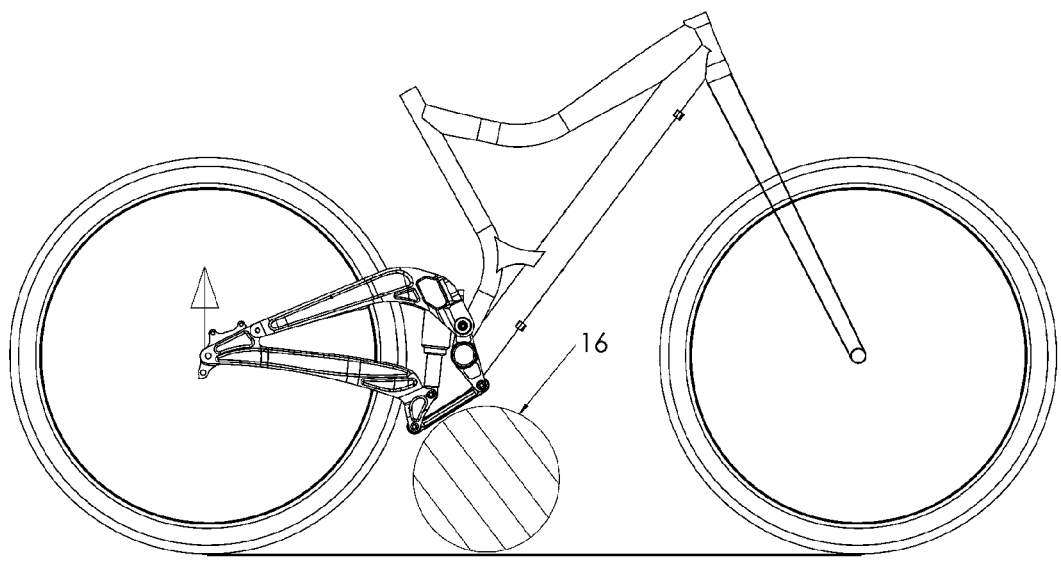
FIG. 109 shows a side view of the Preferred Embodiment making contact with a round immovable trail object where the upward arrow on the rear wheel shows the suspension chassis upward movement from said contact.

Contact of the Link 2 with a Square Immovable Trail Object 15 or a Round Immovable Trail Object 16 will move the rear suspension upward as shown in FIGS. 108 and 109. FIGS. 108 and 109 show vertical arrows at the rear wheel axle indicating the upward movement of the rear wheel and suspension chassis when an immovable trail object comes in contact with Link 2. It is an advantage over prior art for a suspension system to move a wheel upward over trail objects when activated.

The Link 2 of this preferred embodiment is approximately tangent with the rear wheel as indicated by Link Angle Tangent with the Wheel 8. The uncompressed state ground clearance is determined by the Link 2, which is the closest chassis member to the ground and is indicated by The Ground Clearance—Uncompressed State 12.

The Front Triangle Frame 1, Link 2, Left Upper Control Arm 3, Right Upper Control Arm 4, Left Lower Control Arm 5, and Right Lower Control Arm 6, when connected as rotational pivots as described makeup a four-bar linkage system in the preferred embodiment. The Rear Wheel is attached at the Rear Axle Location 19 to the Left Lower Control Arm 5 and Right Lower Control Arm 6. The Left Lower Control Arm 5 and Right Lower Control Arm 6, and subsequently said Rear Wheel, therefore have movement about an instant center. The instant center of the present invention is located above and forward of the crank shaft location.

FIG. 104 shows the Start IC 9, which is the moving instant center in the uncompressed state. End IC 10 is the moving instant center at the fully compressed state. As the Bicycle Rear Wheel Suspension Chassis goes from said uncompressed state to said compressed state said moving instant center moves forward to lower the Bicycle Rear Wheel Suspension Chassis natural frequency. A higher suspension natural frequency at the start of the travel is preferred for higher frequency/small amplitude impacts while decreasing suspension natural frequency as the suspension is compressed from bigger impacts is preferred. The position of the moving instant center is also important in that it is preferred to be above and forward from the Crank Shaft Housing 20 for maximum pedaling efficiency.

Figure 105:
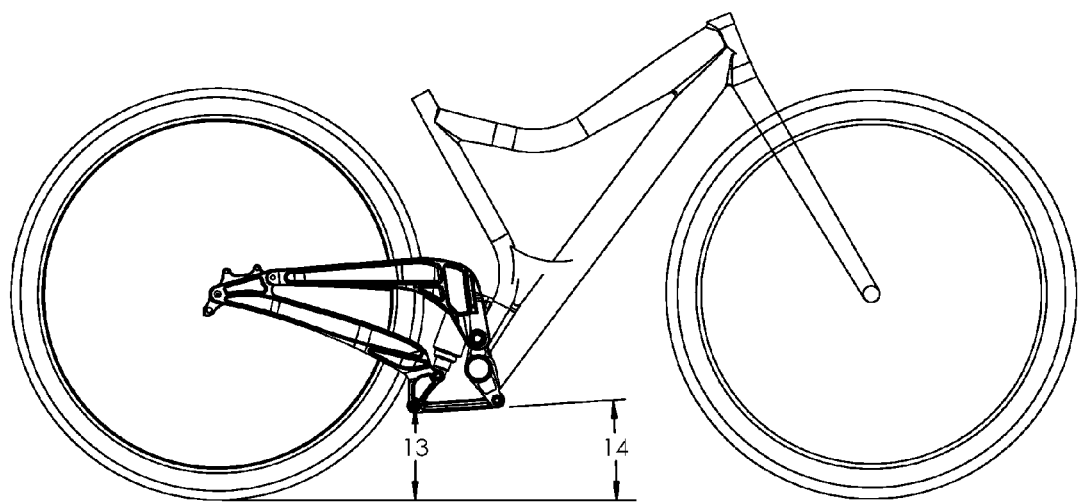
FIG. 105 is shows a compressed suspension state of the Preferred Embodiment showing ground clearance and link angle relative to the ground.
Figure 111:
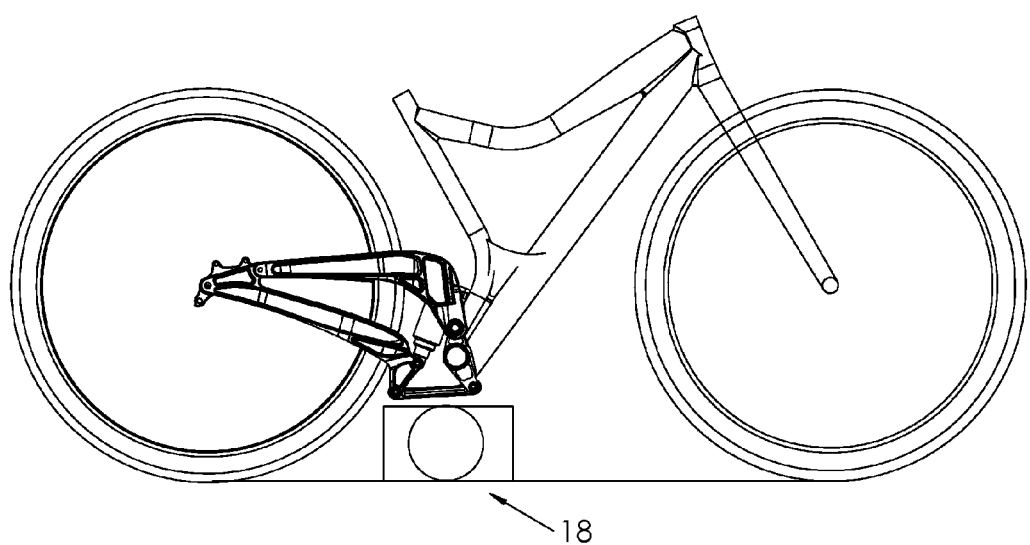
FIG. 111 shows lower link rotated rearward during suspension compression while still having clearance over a trail object.

A preferred embodiment of the Bicycle Rear Wheel Suspension Chassis of the present invention is illustrated in FIG. 105. FIG. 105 is a side view showing the suspension chassis in the compressed state. The Link 2 is shown rotated rearward in the compressed state to give improved ground clearance indicated by Ground Clearance—Compressed State 13. As said suspension chassis is compressed through its travel the Link 2 rotates up out of the way of trail objects. Object 18. The Link 2 of this preferred embodiment in FIG. 105 is approximately parallel with the ground as indicated by Link Angle With Ground 14. FIG. 111 shows a compressed suspension chassis with the Link 2 rotate rearward to clear Trail Object 18. It is an advantage for a low center of gravity suspension chassis to have ground clearance from trail objects when in the compressed state.

Said Shock Absorber 7 provides means for isolating the bicycle rider from trail variation and object impacts with the rear wheel for improved bicycle rider handling, performance, and comfort. Variations can have the Shock Absorber 7 attached to either upper control arms or lower control arms or Link 2. Said Shock Absorber 7 may be attached to the Front Triangle 1 in a way to provide means for isolating the bicycle rider from trail object impacts with the rear wheel.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

Figure 106:
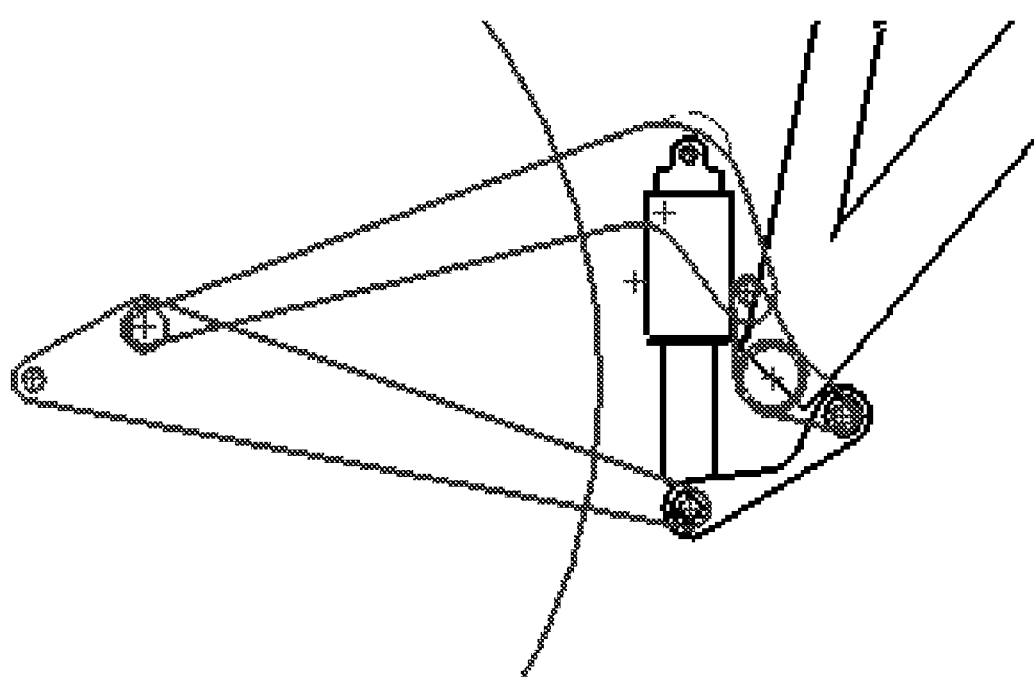
FIG. 106 is an embodiment with the shock mounted between the upper control arm and link.

Description—Alternate Embodiment—FIG. 106, 107

Figure 107:
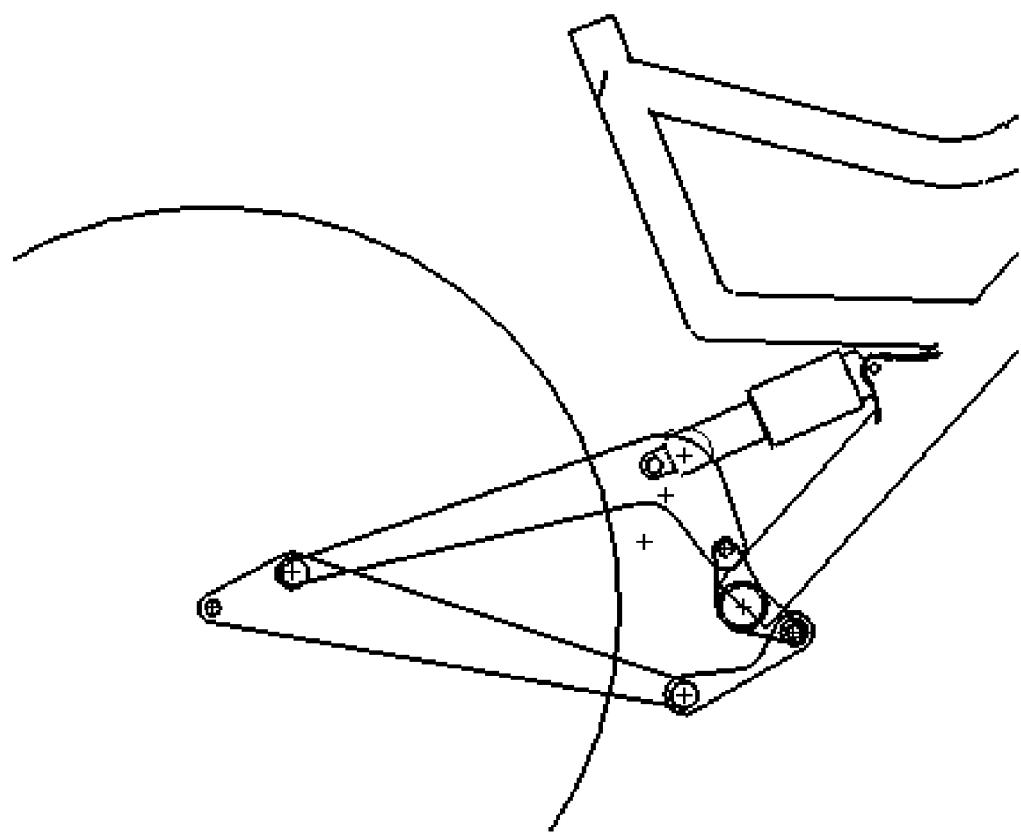
FIG. 107 is a embodiment with the shock is mounted between the upper control arm and the front triangle.

FIGS. 106 and 107 are variations of the Bicycle Rear Wheel Suspension Chassis. FIG. 106 shows the Shock Absorber 7 attached at one end to the upper control arms and the other end to the Lower Link 2. FIG. 107 shows the Shock Absorber 7 attached at one end to the upper control arms and the other end to the Frame Front Triangle 1.

Operation—Alternate Embodiment

The operation of the alternate embodiments described is approximately the same as the preferred embodiments as they are variations in shock placement.

CONCLUSION, RAMIFICATIONS, AND SCOPE

Thus the reader will see that the suspension chassis of the invention provides an improved performance, handling, and low center of gravity bicycle suspension design that can be used on suspension bicycles and give riders more control than previously possible.

While the above description contains many specifications, these should not be construed as limitations on the scope of the invention, but as exemplifications of the presently preferred embodiments thereof. Many other ramifications and variations are possible within the teachings of the invention. For example, another simplified variation has a said Front Triangle Frame 1 with a single swingarm chassis and said Link 2. Said single swingarm chassis has the upper control arms rigidly attached to the lower control arms. The rear wheel attaches to said single swingarm chassis at the Rear Axle Location 19. The Link 2 pivotally attaches to the Front Triangle Frame 1 at the Lower Pivot 22 at one end. At the other end of Link 2 of said simplified variation pivotally attaches to said single swingarm chassis.

Accordingly, the scope of the invention should be determined not by the embodiments illustrated, but by the appended claims and their legal equivalents.

The invention claimed is:

1. A bicycle with a rear suspension system, the bicycle comprising:
   (a) a front frame with a steering housing and a crank shaft housing;
   (b) a swing arm chassis includes an upper arm and a lower arm, wherein said upper arm pivotally attached to said front frame at a forward end and pivotally attached to said lower arm at a rearward end;
   (c) a front wheel and a rear wheel, wherein said rear wheel pivotally attached to an axle of said lower arm;
   (d) a link, said link pivotally attached to said front frame at a location below said crank housing at a first end and a second end pivotally attached to said lower arm such that an imaginary straight line from a center of said first end to a center of said second end is nearly tangent to said rear wheel in an uncompressed state; and
   (e) a shock absorber pivotally attached to said upper arm and lower arm.

2. A bicycle with a rear suspension system, the bicycle comprising:
   (a) a front frame with a steering housing and a crank shaft housing;
   (b) a swing arm chassis includes an upper arm and a lower arm, wherein said upper arm pivotally attached to said front frame at a location above said crank housing at a forward end and pivotally attached to said lower arm at a rearward end;
   (c) a link, said link pivotally attached to said front frame at a location below said crank housing at a first end and a second end pivotally attached to said lower arm wherein said link second end is below said link first end;
   (d) a front wheel and a rear wheel, wherein said rear wheel pivotally attached to an axle of said lower arm;
   (e) wherein said lower arm pivotally attached to said upper arm at a location above and forward of said axle; and
   (f) a shock absorber pivotally attached to said lower arm and said frame.

3. The bicycle as set forth in claim 2 wherein said shock absorber pivotally attached to said upper arm.

4. The bicycle as set forth in claim 2 wherein said link attached to said front frame at a location forward of said crank shaft housing.

5. The bicycle as set forth in claim 3 wherein said link pivotally attached to said front frame at a location forward of said crank shaft housing.

6. A bicycle with a rear suspension system, the bicycle comprising:
   (a) a front frame with a steering housing and a crank shaft housing;
   (b) a swing arm chassis includes an upper arm and a lower arm, wherein said upper arm pivotally attached to said front frame at a location above said crank housing at a forward end and pivotally attached to said lower arm at a rearward end;
   (c) a link, said link pivotally attached to said front frame at a location below said crank housing at a first end and a second end pivotally attached to said lower arm wherein said link second end is below said link first end;
   (d) a front wheel and a rear wheel, wherein said rear wheel pivotally attached to an axle of said lower arm;
   (e) wherein a first end of said lower arm pivotally attached to a one end of said upper arm at a location above and forward of said axle; and
   (f) a shock absorber pivotally attached to another end of said upper arm and said lower arm.

* * * * *